(12) United States Patent
Komori

(10) Patent No.: US 11,650,485 B1
(45) Date of Patent: May 16, 2023

(54) ATTACHMENT OF SMARTPHONE FOR FILM CAMERA

(71) Applicant: FIREWORKS CO., LTD., Toyonaka (JP)

(72) Inventor: Yoshihiro Komori, Toyonaka (JP)

(73) Assignee: FIREWORKS CO., LTD., Toykonaka (JP)

( * ) Notice: Subject to any disclaimer, the term of this patent is extended or adjusted under 35 U.S.C. 154(b) by 0 days.

(21) Appl. No.: 17/922,059

(22) PCT Filed: Sep. 28, 2021

(86) PCT No.: PCT/JP2021/035698
§ 371 (c)(1),
(2) Date: Oct. 28, 2022

(87) PCT Pub. No.: WO2022/176255
PCT Pub. Date: Aug. 25, 2022

(30) Foreign Application Priority Data

Feb. 22, 2021 (JP) .............................. JP2021-067379

(51) Int. Cl.
*G03B 17/48* (2021.01)
*H04N 23/57* (2023.01)

(52) U.S. Cl.
CPC ............. *G03B 17/48* (2013.01); *H04N 23/57* (2023.01)

(58) Field of Classification Search
USPC ........................................................ 396/429
See application file for complete search history.

(56) References Cited

U.S. PATENT DOCUMENTS

2017/0184947 A1* 6/2017 Hyers ................... F16B 21/065
2020/0019042 A1* 1/2020 Crispin ................ G03B 17/566

FOREIGN PATENT DOCUMENTS

CA   2329723 A1 * 11/1999
CN   209879133       12/2019
(Continued)

OTHER PUBLICATIONS

International Search Report for the present PCT-US application No. PCT/JP2021/035698.
(Continued)

*Primary Examiner* — Clayton E. LaBalle
*Assistant Examiner* — Warren K Fenwick
(74) *Attorney, Agent, or Firm* — Stein IP, LLC

(57) ABSTRACT

An attachment of a smartphone for a film camera disclosed herein includes: a camera attachment (31) to be attached to a camera back lid portion; and a smartphone attachment (32) coupled to the camera attachment (31) to hold a smartphone. The camera attachment (31) includes a projection screen (312) on which an image that is photographed is projected through a camera lens. The smartphone attachment (32) includes a correction lens (322) to focus on the image projected on the projection screen and allow a smartphone camera to photograph the image by close photographing. The attachment of a smartphone for a film camera aligns the camera lens, the projection screen, and the correction lens along an optical axis (5) of image capturing of the camera and focuses on an imaging medium of the smartphone to allow the image photographed by the film camera to be digitized and stored.

6 Claims, 3 Drawing Sheets

(56) References Cited

FOREIGN PATENT DOCUMENTS

JP      2001-008070     1/2001
JP      2013-005428     1/2013

OTHER PUBLICATIONS

Written Opinion of International Searching Authority for the present PCT-US application No. PCT/JP2021/035698.
Notice of Reasons for Refusal issued by Japan Patent Office for JP2021-067379 (priority application of the present PCT-US application No. PCT/JP2021/035698.
Decision to Grant a Patent (Notice of Allowance) issued by Japan Patent Office for JP2021-067379 (priority application of the present PCT-US application No. PCT/JP2021/035698.
Decision to Grant a Patent (Notice of Allowance) issued by Japan Patent Office for JP2021-188082, which is a divisional application of JP2021-067379 (priority application of the present PCT-US application No. PCT/JP2021/035698.

\* cited by examiner

ATTACHMENT OF SMARTPHONE FOR FILM CAMERA

CROSS-REFERENCE TO RELATED APPLICATIONS

This is a national stage application of International Application No. PCT/JP2021/035698, filed Sep. 28, 2021, which claims the benefit of Japanese Application No. 2021-067379, filed Feb. 22, 2021, in the Japanese Patent Office, the disclosures of which are incorporated herein by reference.

TECHNICAL FIELD

The present invention relates to an attachment for taking an image photographed by a film camera into a smartphone.

BACKGROUND ART

Conventionally, a film camera guides light from a camera lens to a film disposed on a light receiving window on an optical axis to project and store an image. There has been no camera that digitizes and stores the image in an electronic medium.

CITATIONS LIST

Patent Literature

Patent Literature 1: JP 2013-005428 A
Patent Literature 2: US 2017/0184947 A

SUMMARY OF INVENTION

Technical Problems

Conventionally, a film camera cannot have an image easily recorded and saved in an electronic medium using a camera function of a smartphone.

Solutions to Problems

An attachment of a smartphone for a film camera including: a camera attachment (31) to be attached to a camera back lid portion; and a smartphone attachment (32) coupled to the camera attachment (31) to hold a smartphone, in which the camera attachment (31) includes a projection screen (312) on which an image that is photographed is projected through a camera lens, the smartphone attachment (32) includes a correction lens (322) to focus on the image projected on the projection screen and allow a smartphone camera to photograph the image by close photographing, and the attachment of a smartphone for a film camera aligns the camera lens, the projection screen, and the correction lens along an optical axis (5) of image capturing of the camera and focuses on an imaging medium of the smartphone to allow the image photographed by the film camera to be digitized and stored.

The attachment of a smartphone for a film camera, in which the camera attachment (31) and the smartphone attachment (32) are separable from each other and respectively replaceable with a camera attachment (31) for another film camera and a smartphone attachment for another smartphone.

An attachment system of a smartphone for a film camera, including: a film camera (2); an attachment (3) of a smartphone for a film camera; and a smartphone (4) attached to the attachment, in which the system allows, when a shutter of the film camera (2) opens, light projected on a projection screen (312) to be detected by an image sensor of a smartphone camera (42) to cause a shutter of the camera of the smartphone (4) to be released, and allows an image photographed by the film camera to be coupled to the image sensor and to be stored.

Advantageous Effects of Invention

According to the present invention, a film camera can easily record and save an image in an electronic medium using a camera function of a smartphone.

In addition, the attachment includes the camera attachment and the smartphone attachment, and these attachments can be respectively attached and detached and can be replaced with a camera attachment corresponding to a film camera and a smartphone attachment corresponding to a smartphone, enabling the attachment to be adapted to the film cameras and smartphones of various types.

By using the functions of many film cameras referred to as excellent machines and camera lenses referred to as excellent pieces as they are, and meanwhile, applying the camera function of the smartphone, the image can be digitized to achieve a configuration that meet modern demands such as photo sharing by social network service (SNS) and the like with the minimum number of components and at low cost.

A smartphone is provided with, in a smartphone main body or in an application thereof, functions such as storing and erasing digital photographed data, and at the time of digital photographing, functions of selecting color or monochrome photographing, adjusting while balance, setting photographing condition of photographed data. Therefore, by using the attachment of the present invention, an image sensor such as a charge-coupled device (CCD) sensor or a complementary metal oxide semiconductor (CMOS) sensor, a battery, an input device used to set the photographing condition and the like, a power switch, and a recording medium, which are usually required for digital photographing, can be omitted, and the cost can be reduced.

DESCRIPTION OF EMBODIMENT

Figure 1:
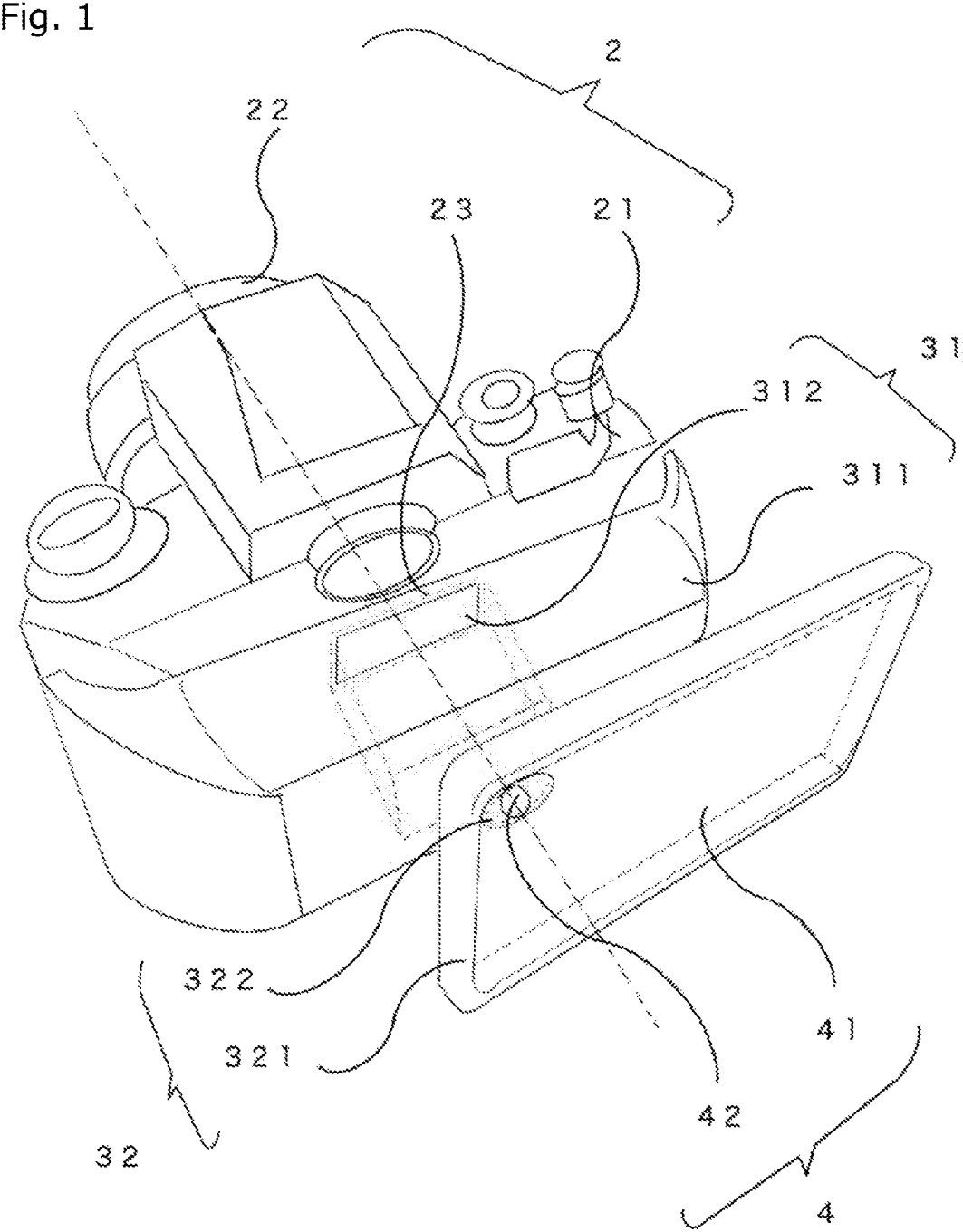
FIG. 1 illustrates a configuration of an attachment system of a smartphone for a film camera.

FIG. 1 illustrates a configuration of an attachment system including a film camera (2), an attachment (3), and a smartphone (4).

The attachment (3) includes a camera attachment (31) that is attached to a back lid portion where a back lid has been removed from the film camera, and a smartphone attachment (32) that is coupled to the camera attachment (31) and holds a smartphone. The camera attachment (31) includes a projection screen (312) on which light is projected through a lens of the film camera. The smartphone attachment (32) includes a correction lens (322) that is placed close to and focus on an image projected on the projection screen and allows a smartphone camera to photograph the entire image clearly. The camera lens, the projection screen, and the correction lens are aligned along an optical axis (5) to match the focus of imaging by the camera with an image sensor (imaging medium) of the smartphone, so that the image of the film camera can be digitized and stored in the electronic medium.

The projection screen (312) is disposed in the camera attachment (31) at a position of a film of the film camera (2) so as to cover a light receiving window (23), and the light entering through the camera lens is projected on the projection screen (312).

The correction lens (322) is built in the smartphone attachment (32) and placed as close as possible to the entire image projected on the projection screen (312) to allow the focus thereof to match with that of a camera (42) part built in a main body (41) of the smartphone (4).

Figure 2:
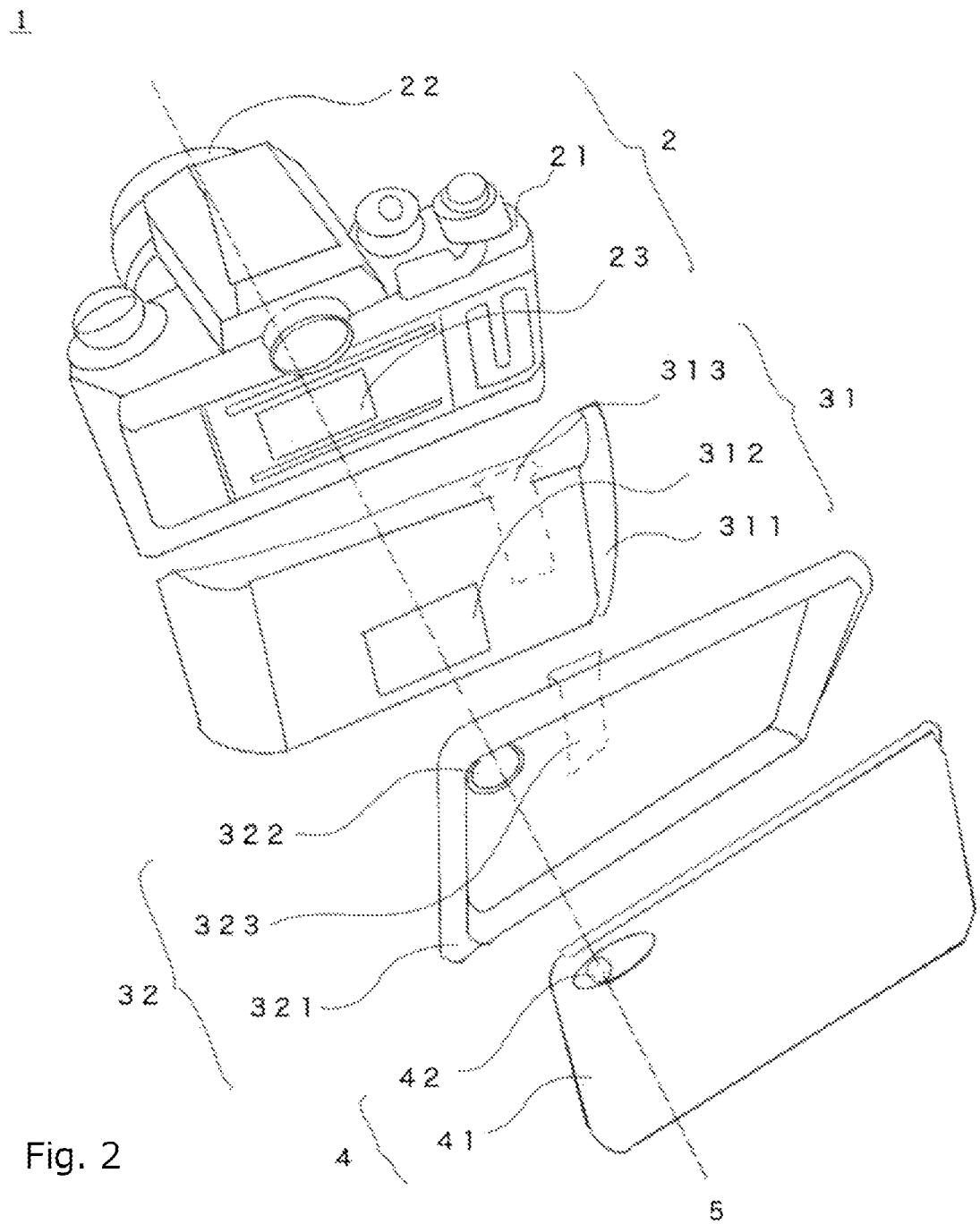
FIG. 2 is an exploded view of the attachment system of a smartphone for a film camera.

FIG. 2 is an exploded view of the attachment system, the drawing showing that a lens (22) of the film camera (2), the projection screen (312) of the camera attachment (31), the correction lens (322) of the smartphone attachment (32) and the camera (42) of the smartphone (4) are aligned on a straight line on the optical axis (5).

The smartphone includes an application including a program for causing the image sensor of the smartphone camera to detect light entering from the film camera lens and being projected on the projection screen, and causing a shutter of the smartphone camera to be released.

In a state where the smartphone application is activated, because the shutter of the film camera is closed, the image sensor of the smartphone camera recognizes black and the shutter of the smartphone does not operate. When the shutter of the film camera is released, a shutter curtain of the film camera opens and the image is projected on the projection screen. When the image sensor of the smartphone camera aligned on the optical axis detects light and while the light is entering, the image sensor reads an electric signal indicating that the shutter curtain of the film camera is open, and in association thereto, the shutter of the smartphone camera is opened. Thereafter, when the shutter of the film camera closes, the projection screen becomes black, and the image sensor of the smartphone camera detects black, and it is recognized that the shutter curtain of the film camera is closed. During the timing when the shutter of the smartphone camera is open, for example, within a certain time period from when the shutter starts opening, the photographed image of the film camera is captured in the image sensor (corresponding to the shutter releasing). Electronic data captured by the image sensor can be stored in an electronic medium such as a recording memory.

Figure 3:
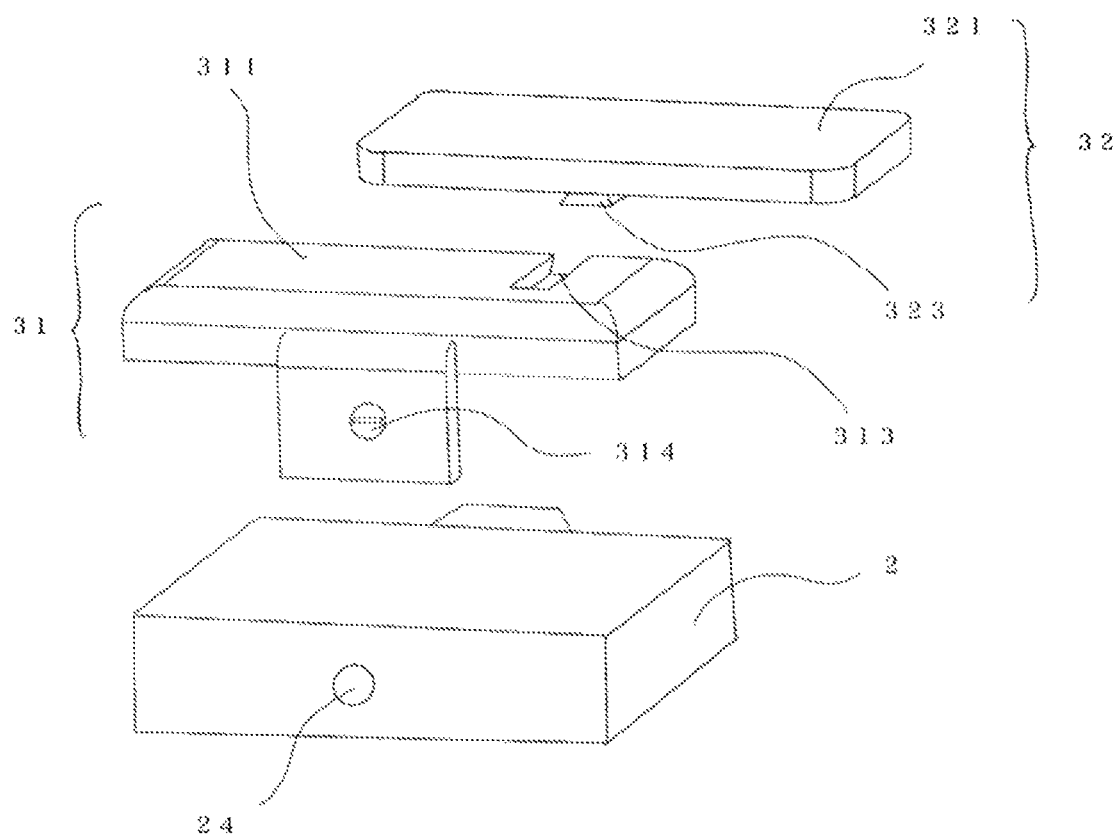
FIG. 3 illustrates an assembly configuration of the attachment system of a smartphone for a film camera.

FIG. 3 illustrates a configuration of the attachment, the drawing showing that the camera attachment (31) and the smartphone attachment (32) can be separated and replaced. For example, a protrusion (323) of a main body (321) of the smartphone attachment can be slid into a recess (313) of a main body (311) of the camera attachment to allow the attachments to be easily attached to and detached from each other, and are replaced. In addition, the recess and the protrusion may be exchanged with each other. Further, a lock function may be provided so as to prevent the attachment from moving during operation. In addition, this method of attaching, detaching, and replacing is an example. By enabling the attachment to be attached, detached, and replaced, the attachment can be adapted to various types of film cameras and smartphones.

The replacement of the camera back lid and the camera attachment (31) in FIG. 3 is described as an example. Many models of film cameras each have, at a camera bottom, a tripod screw holes (24). Using the tripod screw hole (24), a mounting screw hole (314) integrated with a camera attachment bottom and the tripod screw hole (24) at the camera bottom are aligned and fitted to each other, and are fixed by a screw. In addition, because many models of film cameras are of an opening and closing hinge type, the camera back lid and the camera attachment (31) can be easily replaced by removing a pivot rod of the hinge.

REFERENCE SIGNS LIST 1 attachment system of a smartphone
2 film camera
21 main body
22 lens
23 light receiving window
24 tripod screw hole
opening and closing hinge
3 attachment
31 camera attachment
311 main body
312 projection screen
313 recess
314 mounting screw hole
32 smartphone attachment
321 main body
322 correction lens
323 protrusion
4 smartphone
41 main body
42 camera
5 optical axis

The invention claimed is:

1. An attachment of a smartphone for a film camera, the attachment (3) being to be attached to a back lid portion of a film camera (2), the back lid portion being a portion where a back lid of the film camera (2) has been removed, the attachment (3) comprising a projection screen (312) on which an image that is photographed is projected through a camera lens of the film camera (2), wherein
   the attachment (3) is to be attached to the back lid portion such that the projection screen (312) is placed at a position of a film of the film camera (2), and
   the attachment (3) is to hold the smartphone (4) at a position where the smartphone (4) is capable of photographing the image projected on the projection screen (312).

2. The attachment of a smartphone for a film camera according to claim 1, wherein
   the attachment (3) is divided into a camera attachment (31) and a smartphone attachment (32), the camera attachment (31) and the smartphone attachment (32) being detachably coupled to each other,
   the camera attachment (31) includes the projection screen (312) and is to be attached to the back lid portion such that the projection screen (312) is placed at a position of a film of the film camera (2), and
   the smartphone attachment (32) is to hold the smartphone (4) at a position where the smartphone (4) is capable of photographing the image projected on the projection screen (312).

3. The attachment of a smartphone for a film camera according to claim 1, wherein
   the attachment (3) includes a correction lens (322) to allow the smartphone to photograph the image projected on the projection screen (312) by close photographing.

4. An attachment system of a smartphone for a film camera comprising:
- a film camera (2);
- an attachment (3) of a smartphone for a film camera according to claim 1, and
- a smartphone (4) attached to the attachment (3), wherein the smartphone (4) includes an application,
- the application causes the smartphone (4) to, when an image sensor of a smartphone camera (42) is detecting light projected on the projection screen (312) by a shutter of the film camera (2) opening, store an image captured by the film camera (2) and detected by the image sensor.

5. The attachment of a smartphone for a film camera according to claim 2, wherein
- the smartphone attachment (32) includes a correction lens (322) to allow the smartphone to photograph the image projected on the projection screen (312) by close photographing.

6. An attachment system of a smartphone for a film camera comprising:
- a film camera (2);
- an attachment (3) of a smartphone for a film camera according to claim 2, and
- a smartphone (4) attached to the attachment (3), wherein the smartphone (4) includes an application,
- the application causes the smartphone (4) to, when an image sensor of a smartphone camera (42) is detecting light projected on the projection screen (312) by a shutter of the film camera (2) opening, store an image captured by the film camera (2) and detected by the image sensor.

* * * * *